United States Patent
Handler et al.

(10) Patent No.: US 8,695,331 B2
(45) Date of Patent: Apr. 15, 2014

(54) PROCEDURE TO DIAGNOSE A PARTICLE FILTER AND DEVICE TO IMPLEMENT THE PROCEDURE

(75) Inventors: Torsten Handler, Stuttgart (DE); Michael Kolitsch, Weissach (DE); Tobias Pfister, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1948 days.

(21) Appl. No.: 11/800,020

(22) Filed: May 3, 2007

(65) Prior Publication Data
US 2008/0000218 A1    Jan. 3, 2008

(30) Foreign Application Priority Data
Jun. 29, 2006 (DE) .......................... 10 2006 029 990

(51) Int. Cl.
*F01N 3/02* (2006.01)

(52) U.S. Cl.
USPC ............... 60/311; 60/274; 60/277; 60/286

(58) Field of Classification Search
USPC ........... 60/277, 276, 284, 286, 290; 73/28.01, 73/61.71; 95/18
See application file for complete search history.

(56) References Cited

U.S. PATENT DOCUMENTS

| | | | |
|---|---|---|---|
| 4,656,832 A * | 4/1987 | Yukihisa et al. | 60/303 |
| 6,432,168 B2 * | 8/2002 | Schonauer | 95/18 |
| 7,574,895 B2 * | 8/2009 | Schnell et al. | 73/28.01 |
| 2006/0042238 A1 * | 3/2006 | Koga et al. | 60/297 |

FOREIGN PATENT DOCUMENTS

| | | | |
|---|---|---|---|
| DE | 196 51 611 | 6/1998 | |
| DE | 101 33 384 | 1/2003 | |
| DE | 101 33 385 | 1/2003 | |
| DE | 103 00 593 | 7/2004 | |
| DE | 103 58 195 | 7/2005 | |
| DE | 10 2005 034 247 | 1/2007 | |
| JP | 2000-170521 | 6/2000 | |
| JP | 2002-285822 | 10/2002 | |
| JP | 2003-254042 | 9/2003 | |
| JP | 2004-197722 | 7/2004 | |
| JP | 2005-327192 | 11/2005 | |
| WO | WO 92/02807 | 2/1992 | |
| WO | WO 2005050174 | * 6/2005 | G01N 15/06 |
| WO | WO 2007/050384 | 5/2007 | |

* cited by examiner

*Primary Examiner* — Jesse Bogue
(74) *Attorney, Agent, or Firm* — Merchant & Gould P.C.

(57) ABSTRACT

A procedure to diagnose a particle filter disposed in an exhaust gas area of an internal combustion engine as well as a device to implement the procedure is proposed. Provision is made to ascertain the degree of efficiency of the particle filter on the basis of the upstream particle flow occurring upstream in front of the particle filter and on the basis of the downstream particle flow occurring downstream behind the particle filter. The ascertainment of the degree of efficiency of the particle filter allows for an On-Board-Diagnosis of the particle filter, with which compliance with specified exhaust gas threshold values can be assured.

8 Claims, 1 Drawing Sheet

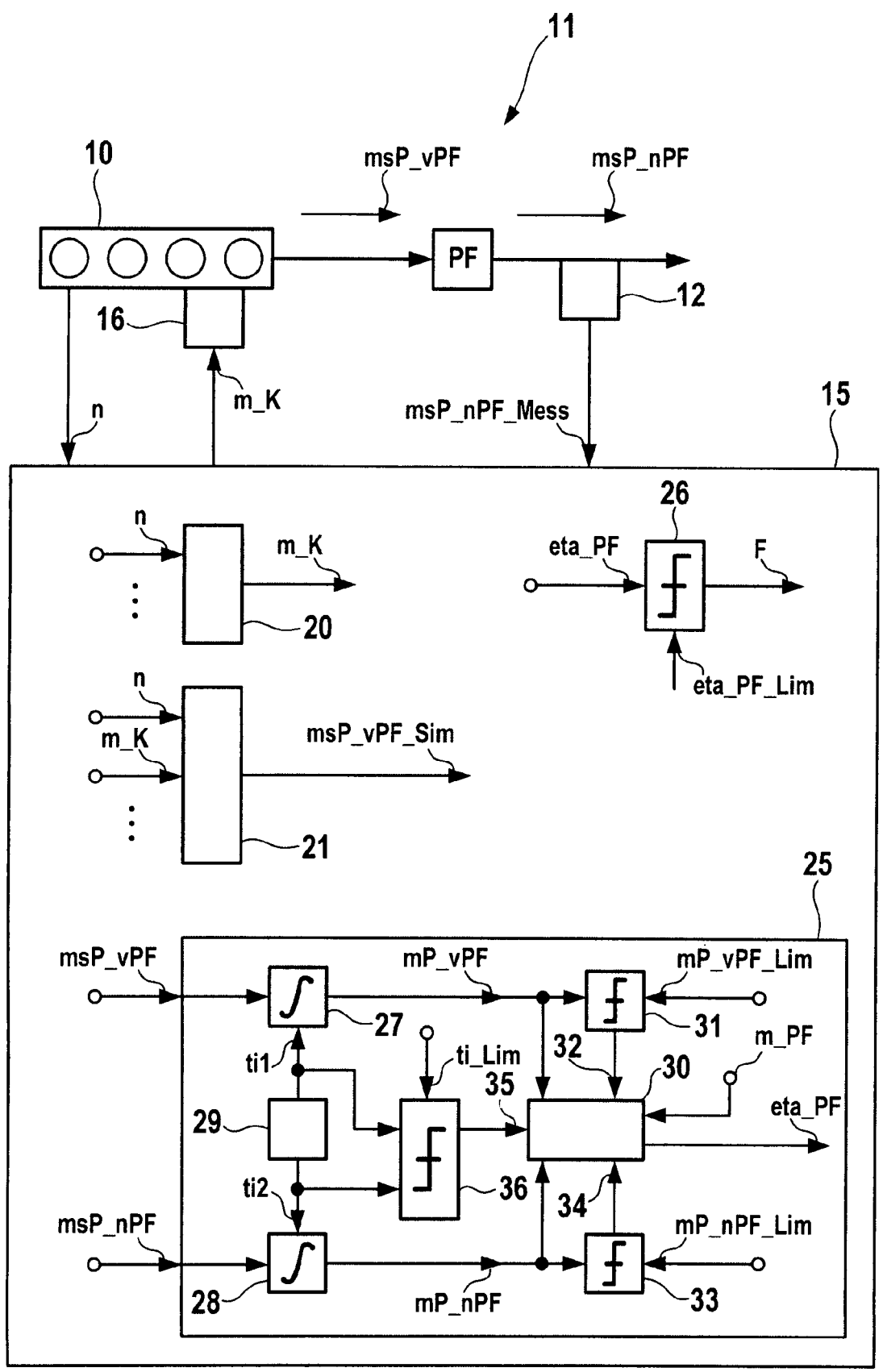

PROCEDURE TO DIAGNOSE A PARTICLE FILTER AND DEVICE TO IMPLEMENT THE PROCEDURE

The invention proceeds from a procedure to diagnose a particle filter disposed in the exhaust gas area of an internal combustion engine and from a device to implement the procedure according to the class of the independent claims.

The subject matter of the invention at hand is also a computer program as well as a computer program product.

From the German patent DE 103 00 593 A1, a procedure to diagnose an adjuster disposed in an exhaust gas duct as well as a device to implement the procedure has been made known, which do without an additional sensor. The internal combustion engine contains an exhaust gas recirculation, which feeds the exhaust gas in an activated condition out of the exhaust gas duct and into the intake manifold. In at least one operating state of the internal combustion engine, a first intake manifold pressure at a first position of an element of the adjuster and a second intake manifold pressure at a second position of the element of the adjuster are ascertained during an activated exhaust gas recirculation. The operation of the adjuster is monitored as a function of the difference between the first and second intake manifold pressure.

In the German patent DE 103 58 195 A1, a procedure to monitor a component disposed in the exhaust gas area of an internal combustion engine is described, in which the low-pass properties, which are determined by the heating capacity of the component, are checked by means of an assessment of a measurement of a first exhaust gas temperature, which occurs in front of the component being monitored, and a second exhaust gas temperature, which is acquired by a temperature sensor behind the component being monitored. The procedure described allows a monitoring of the component for a change, which, for example, can have occurred during an inadmissible manipulation. In the extreme case, the component to be monitored, for example a catalytic converter and/or a particle filter can have been completely removed. The monitoring occurs within the scope of controls, which has to be implemented with regard to the compliance with exhaust gas norms, or during the normal operation of the internal combustion engine.

A particle sensor is, for example, as described in the German patent DE 101 33 385 A1, which contains a chamber, which can be connected to an exhaust gas stream of an internal combustion engine. A first electrode is disposed on the top side of the chamber. On the bottom side across from the first electrode, a second electrode is disposed. The chamber between the two electrodes is hollow. During the operation of the known sensor, particles, especially sooty particles, move into the chamber and lodge in the cavity between the two electrodes. The particles, which are at least slightly electrically conductive, bridge the space between the two electrodes, so that the electrical impedance of the particle sensor changes. The impedance or the chronological change of the impedance can be assessed. Both of these assessments are a measurement for the loading, respectively the increase in the loading, of the particle sensor with particles. As the measuring effect is based on an accumulation of particles, the particle sensor can be denoted as an integrated particle sensor.

An additional particle sensor is described in the German patent DE 101 33 384 A1. In the case of this particle sensor, both of the electrodes are disposed on one side of the chamber and grab comb like in each other. Also in the case of this integrated particle sensor, the electrical impedance and/or its changed state are used at least as a measurement for the particle mass, respectively particle quantity, in the exhaust gas, which occurs within a specified time or is based upon a certain road-test route.

In the German patent DE 196 51 611 A1, a particle sensor is described, which acquires and assesses a potential difference between at least one electrically conductive electrode disposed in the exhaust system and the electrically conductive exhaust gas pipe. The potential difference arises by means of the particles taking on an electrical charge, which touch in passing on at least one of the electrodes. The output signal of the known particle sensor is a measurement for the particle flow, which can be either a particle mass flow or a particle quantity flow. Provision is made in a configuration of the known particle sensor for two electrodes, which with regard to the direction of flow are disposed spatially in a row. From the assessment of the chronological delay between the measurement signals acquired separately for each electrode, a measurement for the particle flow velocity can be obtained.

In the German patent DE 10 2005 034 247 A1, a procedure to monitor an exhaust gas threshold value of an internal combustion engine using an engine control system has been made known, whereby the motor control system has at least one exhaust gas sensor and emits an error signal when the exhaust gas threshold value is exceeded. Provision is particularly made for a particle sensor to be the exhaust gas sensor.

If the emissions predicted for the present driving condition are ascertained with the aid of an engine model and are compared with the signal of the exhaust gas sensor or a reference value for the emissions derived from the model, the prescribed driving cycle during the certification of a threshold value monitoring system can be taken into account by the formation of the model; and a defective system can then assuredly be recognized in the practical operation and even under atypical driving conditions without leading to the errant release of error signals.

The task underlying the invention is to allow a diagnosis of a particle filter disposed in the exhaust gas area of an internal combustion engine.

The task is solved in each case by the characteristics denoted in the independent claims.

Provision is made in the procedural approach according to the invention to diagnose a particle filter disposed in the exhaust gas area of an internal combustion engine, in that the degree of efficiency of the particle filter is ascertained using the upstream particle flow occurring upstream in front of the particle filter and using the downstream particle flow occurring downstream behind the particle filter.

The ascertainment of the degree of efficiency according to the invention, for which provision is made, allows for an on-board acquisition of the condition of the particle filter. This acquisition allows for an assessment of the effectiveness of the particle filter. For example, a decision can be made based on the ascertainment of the degree of efficiency, if the particle filter is defective and must be replaced. The ascertainment of the degree of efficiency of the particle filter particularly allows for the safeguarding of the compliance with the specified exhaust gas threshold values.

The term "particle flow" is to be understood in such a way that it can refer to the particle flow or stream and also alternatively or additionally to the particle mass or the particle quantity.

Advantageous embodiments and modifications of the procedural approach according to the invention result from the dependent claims.

Provision is made in one embodiment for an error signal to be provided if the degree of efficiency of the particle filter undershoots a degree of efficiency threshold value. With this step the particle filter can be monitored to see if it is so far damaged that the corresponding predetermined OBD (On-Board-Diagnosis) threshold values have been exceeded. In which case, the particle filter must be replaced.

Provision is made in one embodiment for the upstream particle flow occurring upstream in front of the particle filter to be ascertained using at least one of the operating parameters of the internal combustion engine. The exhaust gas lambda and/or the load on the internal combustion engine are, for example, suitable as an operating parameter. A measurement for the engine rotational speed and/or a measurement for the fuel delivered to the internal combustion engine are especially suitable as an operating parameter.

Provision is made in one embodiment for the measurement of the downstream particle flow. A particle sensor specified in the state of the art is suitable for the task. Beside the particle sensors, which provide a measurement for the particle concentration, respectively the particle flow, integrating particle sensors are especially suitable for the task, whose output signal is a measurement for the accumulated particle mass, respectively particle quantity, in the sensor. The particular applicability of the integrating particle sensors results by means of an averaging connected with the output signals, which chronologically compensates for short-term signal fluctuations.

Provision is made in one embodiment for the degree of efficiency of the particle filter to be ascertained, if the particle mass, respectively the particle quantity, in front of the particle filter achieves an upstream threshold value. This step assures that only a particle mass or a particle quantity, which lies above the threshold value, is used to ascertain the degree of efficiency of the particle filter.

Provision can be alternatively made for the degree of efficiency of the particle filter to be ascertained, if the particle mass, respectively the particle quantity, ascertained behind the particle filter achieves a downstream threshold.

Furthermore, provision can alternatively be made for the degree of efficiency of the particle filter to be ascertained, if the measurement period achieves a measurement period threshold value.

The alternative embodiments ensure in each case that the diagnosis is implemented only when the particle mass, respectively the particle quantity, lies above the upstream threshold, the downstream threshold or the measurement period threshold.

Provision is made in a modification of this embodiment for the upstream threshold value and/or the downstream threshold value and/or the measurement period threshold value to be given as a function of the functional principle of the particle sensor. An adaptation to the measurement sensitivity of the particle sensor can thereby be conducted.

Provision is made in one embodiment for the degree of efficiency of the particle filter to be ascertained as a function of the degree of depletion of the particle filter, which can have an effect on the degree of efficiency of the particle filter, which, for example depends on the configuration of the particle filter.

The device according to the invention to implement the procedure concerns initially a control unit, which is specially designed to implement the procedure.

As previously mentioned, an integrating particle sensor is especially suited to acquire the particle flow. Due to its mode of operation, the sensor already implements an averaging, which is particularly practical in the application at hand.

Provision is made in the computer program according to the invention to execute all steps of the procedure according to the invention, if it is being run on a computer.

The computer program product according to the invention with a program code stored on a machine-readable carrier executes the procedure according to the invention, if the program is executed on a computer or in a control unit.

Additional advantageous modifications and embodiments of the procedural approach according to the invention result from additional dependent claims. An example of embodiment of the invention is depicted in the drawing and explained in detail in the following description.

FIG. 1 shows a technical layout, in which a procedure according to the invention is operating.

The FIGURE shows an internal combustion engine 10, in whose exhaust gas area 11, a particle filter PF and a particle sensor 12 downstream behind the particle filter PF are disposed. Upstream in front of the particle filter PF, an upstream particle flow msP_vPF occurs; and downstream behind the particle filter PF, a downstream particle flow msP_nPF occurs.

The internal combustion engine 10 provides a measurement for an engine rotational speed n to a control unit 15, and the control unit 15 provides a fuel signal m_K to a fuel metering device 16. The particle sensor 12 transmits a particle sensor measurement signal msP_nPF_Mess to the control unit 15.

The control unit 15 contains a fuel signal ascertainment 20, which ascertains the fuel signal m_K at least from the engine rotational speed n.

The control unit 15 contains additionally a particle flow ascertainment 21, to which the engine rotational speed n and the fuel signal m_K are provided and which supplies a calculated upstream particle flow msP_vPF_Sim.

The control unit 15 contains additionally a particle filter degree of efficiency ascertainment 25, which ascertains the degree of efficiency of the particle filter eta_PF from the upstream particle flow msP_vPF and the downstream particle flow msP_nPF. This degree of efficiency of the particle filter eta_PF is compared with a particle filter degree of efficiency threshold value eta_PF_Lim in a first comparator 26. The first comparator 26 provides an error signal F as a function of the comparison result.

The particle filter degree of efficiency ascertainment 25 contains a first integrator 27 for the integration of the upstream particle flow msP_vPF and a second integrator 28 for the integration of the downstream particle flow msP_nPF. The integration is controlled by an interval timer, which emits a first measurement period control signal ti1 to the first integrator 27 and a second measurement period control signal ti2 to a second integrator 28.

The first integrator 27 provides the upstream particle mass mP_vPF, which is provided to a degree of efficiency computation 30 as well as to a second comparator 31. The second comparator 31 compares the upstream particle mass mP_vPF with an upstream particle mass threshold value mP_vPF_Lim and emits as a function of the comparison result a first switching signal 32 to the degree of efficiency computation 30.

The second integrator 28 provides the downstream particle mass mP_nPF, which is provided to the degree of efficiency computation 30 as well as to a third comparator 33. The third comparator 33 compares the downstream particle mass mP_nPF with a downstream particle mass threshold value mP_nPF_Lim and emits as a function of the comparison result a second switching signal 34 to the degree of efficiency computation 30.

The degree of efficiency computation 30 is additionally provided with a third switching signal 35, which a fourth comparator 36 supplies, which is provided with the first and the second measurement period control signal ti1, ti2 as well as a measurement period threshold value ti_Lim.

The degree of efficiency computation 30 is additionally provided with a degree of depletion signal m_PF.

The arrangement works in the following manner:

The fuel signal ascertainment 20 ascertains at least as a function of the engine rotational speed n the fuel signal m_K, which establishes the fuel quantity, respectively fuel mass delivered to the internal combustion engine 10, for example, for each individual injection operation.

Due to incomplete combustion processes, particles, especially sooty particles, can appear in the exhaust gas of the internal combustion engine 10, which depart the internal combustion engine 10 as the upstream particle flow msP_vPF. Provision is made for the particle filter PF to be in the exhaust gas area 11 of the internal combustion engine 10 for the filtering of the particles.

The diagnosis according to the invention, which ascertains the particle filter degree of efficiency eta_PF of the particle filter, is suited for compliance with an exhaust gas regulation, which establishes the particle emissions with regard to a road-test route or fuel consumption.

Provision is made for the particle filter degree of efficiency ascertainment 25 to ascertain the particle filter degree of efficiency eta_PF. It ascertains the particle filter degree of efficiency eta_PF using the upstream particle flow msP_vPF and the downstream particle flow msP_nPF.

In the simplest case both particle flows msP_vPF, msP_nPF are immediately provided to the degree of efficiency computation 30, which supplies the particle filter degree of efficiency eta_PF on the basis of a division.

Provided the particle filter degree of efficiency eta_PF undershoots the specified particle filter degree of efficiency threshold value eta_PF_Lim, the first comparator 26 provides the error signal F, which can be deposited in an unspecified error memory and/or brought to display.

Provision is made according to one embodiment to calculate the upstream particle flow msP_vPF using at least one operating parameter of the internal combustion engine 10. The measurement for the engine rotational speed n and/or the measurement for the fuel delivered to the internal combustion engine 10, which the fuel signal m_K reflects, are, for example, well suited for the task.

The upstream particle flow ascertainment 21 provides the calculated upstream particle flow msP_vPF_Sim on the basis of deposited characteristic curves and/or engine characteristic maps by using the previously described signal n, m_K, of which there is at least one.

Provision is made according to another embodiment to measure the downstream particle flow msP_nPF by the particle sensor 12, which supplies the downstream particle flow measurement signal msP_nPF_Mess.

Provision is made according to another embodiment for the ascertainment of the particle filter degree of efficiency eta_PF to result not on the basis of the upstream and downstream particle flows msP_vPF, msP_nPF, but on the basis of the particle quantity or the particle mass, which occurs upstream, respectively downstream, of the particle filter PF.

For this purpose, provision is initially made for the first integrator 27, which integrates the upstream particle flow msP_vPF within the time of integration established by the first measurement period control signal ti1, and which supplies the upstream particle mass mP_vPF.

Provision can be made for the second integrator 28 to be a function of the embodiment of the particle sensor 12. The second integrator 28 integrates the downstream particle flow msP_nPF as a function of the second measurement period control signal ti2 and supplies the downstream particle mass mP_nPF.

Provided that the particle sensor 12 is embodied as an integrating particle sensor 12, the integration within the particle sensor 12 takes place as a result of the embodiment of the particle sensor 12, so that the second integrator 28 can be omitted.

Provision is made according to one embodiment for the integration to continue up until either the upstream particle mass threshold value mP_vPF_Lim or the downstream particle mass threshold value mP_nPF_Lim is achieved. The achievement of the upstream particle mass threshold value mP_vPF_Lim is established in the second comparator 31, which provides the first control signal 32 to the degree of efficiency computation 30, which then causes the degree of efficiency computation 30 to calculate the degree of efficiency of the particle filter eta_PF.

The achievement of the downstream particle mass threshold value mP_nPF_Lim is established in the third comparator 33, which provides the initial second control signal 34 to the degree of efficiency computation 30, which then causes the degree of efficiency computation 30 to calculate the degree of efficiency of the particle filter eta_PF.

The advantage in specifying either the one or the other threshold values mP_vPF_Lim, mP_nPF_Lim is that provision is made for a chronological averaging when the particle flows msP_vPF, msP_nPF are acquired. In so doing, the provision of mistaken error signals F is largely avoided.

Furthermore, by means of the specification of the one or the other threshold value mP_vPF_Lim, mP_nPF_Lim, the functional principle of the particle sensor 12 can be taken into account. Especially in the case of an integrating particle sensor 12, the specification of the downstream particle mass threshold value mP_nPF_Lim is practical, in order to operate the particle sensor 12 in an effective measurement range.

Provision can be made for the specification of the measurement period threshold value ti_Lim as an alternative to the specification of at least one of the threshold values mP_vPF_Lim, mP_nPF_Lim. The fourth comparator 36 compares the measurement period threshold value ti_Lim either with the first measurement period control signal ti1 or with the second measurement period control signal ti2 and provides as a function of the comparison result the third control signal 35, which causes the degree of efficiency computation 30 to calculate the degree of efficiency of the particle filter eta_PF.

The measurement period control signals ti1, ti2, which establish the integration times of the first and/or the second integrator 27, 28 can be established as a function of the expected particle flow msP_vPF, msP_nPF and especially as a function of the functional principle of the particle sensor 12.

Instead of reference to the particle mass, provision can be made to refer to the particle quantity.

Additionally as an embodiment, provision can be made for the ascertainment of the degree of efficiency of the particle filter eta_PF to occur in the degree of efficiency computation 30 based in fact on the particle flows msP_vPF, msP_nPF; however, the computation results first when at least one particle mass threshold value mp_vPF_Lim mp_nPF_Lim or the measurement period threshold value ti_Lim has been achieved.

Provision is made in one embodiment for the degree of efficiency of the particle filter eta_PF to be calculated as a function of the degree of depletion of the particle filter PF, which the degree of depletion signal m_PF reflects. The degree of depletion signal m_PF is ascertained, for example, on the basis of the exhaust gas pressure difference occurring at the particle filter PF. Additionally the degree of depletion signal m_PF can be ascertained on the basis of the upstream particle flow msP_vPF and on the basis of an unspecified regeneration signal, which reflects the regeneration processes of the particle filter PF, during which the particles lodged in the particle filter PF are burned out.

The invention claimed is:

1. A method of diagnosing a particle filter disposed in an exhaust gas area of an internal combustion engine, the method comprising:
ascertaining a degree of efficiency of the particle filter by evaluation of an upstream particle flow detected in front of the particle filter in relation to a downstream particle flow detected behind the particle filter upon verification of one of: a downstream particle mass measured behind the particle filter achieving a downstream threshold value; an upstream particle mass measured in front of the particle filter achieving an upstream threshold value; and a measurement period achieving a measurement period threshold value.

2. A method according to claim 1, further comprising providing an error signal if the degree of efficiency of the particle filter is less than a threshold value for the degree of efficiency.

3. A method according to claim 1, further comprising determining the upstream particle flow from at least one operating parameter of the internal combustion engine.

4. A method according to claim 3, wherein determining includes from a measurement for a rotational speed of the internal combustion engine or a measurement for a fuel delivered to the internal combustion engine.

5. A method according to claim 1, further comprising measuring the downstream particle flow.

6. A method according to claim 1, wherein the upstream threshold value, the downstream threshold value, or the measurement period threshold value are specified as a function of the functional principle of a particle sensor.

7. A device to diagnose a particle filter disposed in an exhaust gas area of an internal combustion engine, the device comprising a control unit for ascertaining a degree of efficiency of the particle filter by evaluation of an upstream particle flow detected in front of the particle filter in relation to a downstream particle flow detected behind the particle filter upon verification of one of: a downstream particle mass measured behind the particle filter achieving a downstream threshold value; an upstream particle mass measured in front of the particle filter achieving an upstream threshold value; and a measurement period achieving a measurement period threshold value.

8. A computer program product with a program code stored on a machine-readable carrier to implement instructions for ascertaining a degree of efficiency of the particle filter by evaluation of an upstream particle flow detected in front of the particle filter in relation to a downstream particle flow detected behind the particle filter upon verification of one of: a downstream particle mass measured behind the particle filter achieving a downstream threshold value; an upstream particle mass measured in front of the particle filter achieving an upstream threshold value; and a measurement period achieving a measurement period threshold value.

* * * * *